No. 684,146. Patented Oct. 8, 1901.
J. G. WEBB.
APPARATUS FOR APPLYING RUBBER TIRES TO VEHICLE WHEELS.
(Application filed Nov. 26, 1900.)

(No Model.) 5 Sheets—Sheet I.

WITNESSES:
J. C. Dawley
T. W. Schaefer

INVENTOR.
John G. Webb,
BY
ATTORNEY.

No. 684,146. Patented Oct. 8, 1901.
J. G. WEBB.
APPARATUS FOR APPLYING RUBBER TIRES TO VEHICLE WHEELS.
(Application filed Nov. 26, 1900.)

(No Model.) 5 Sheets—Sheet 2.

WITNESSES:
J. C. Dawley
F. W. Schaefer

INVENTOR.
John G. Webb
BY
H. A. Toulmin
ATTORNEY.

No. 684,146. Patented Oct. 8, 1901.
J. G. WEBB.
APPARATUS FOR APPLYING RUBBER TIRES TO VEHICLE WHEELS.
(Application filed Nov. 26, 1900.)
(No Model.) 5 Sheets—Sheet 3.

No. 684,146. Patented Oct. 8, 1901.
J. G. WEBB.
APPARATUS FOR APPLYING RUBBER TIRES TO VEHICLE WHEELS.
(Application filed Nov. 26, 1900.)
(No Model.) 5 Sheets—Sheet 4.

No. 684,146. Patented Oct. 8, 1901.
J. G. WEBB.
APPARATUS FOR APPLYING RUBBER TIRES TO VEHICLE WHEELS.
(Application filed Nov. 26, 1900.)
(No Model.) 5 Sheets—Sheet 5.

WITNESSES: J. C. Dawley F. H. Schaefer

INVENTOR. John G. Webb, BY H. A. Toulmin ATTORNEY.

UNITED STATES PATENT OFFICE.

JOHN G. WEBB, OF SPRINGFIELD, OHIO, ASSIGNOR TO THE VICTOR RUBBER COMPANY, OF SAME PLACE.

APPARATUS FOR APPLYING RUBBER TIRES TO VEHICLE-WHEELS.

SPECIFICATION forming part of Letters Patent No. 684,146, dated October 8, 1901.

Application filed November 26, 1900. Serial No. 37,761. (No model.)

*To all whom it may concern:*

Be it known that I, JOHN G. WEBB, a citizen of the United States, residing at Springfield, in the county of Clark and State of Ohio, have invented certain new and useful Improvements in Apparatus for Applying Rubber Tires to Vehicle-Wheels, of which the following is a specification, reference being had therein to the accompanying drawings.

This invention relates to apparatus for applying rubber tires to vehicle-wheels, and is devised more particularly for use in applying that class of tires which are held within a channeled rim by means of one or more wires passing longitudinally through the rubber tire and having their ends united after the tire is seated in the rim.

The chief object of my present invention is to provide an apparatus whereby tires of this description may be easily and quickly applied without the employment of skilled labor and with a minimum expenditure of time.

More specifically considered, my invention has for its objects the provision of an apparatus of this character comprising means whereby the rubber may be readily compressed upon the wires prior to the uniting of the ends of these latter and whereby said compression may be removed from the rubber in a simple, expeditious, and uniform manner after the joining of the ends of the wires has been accomplished.

A further object of my invention is to provide a machine which shall be adapted for use in connection with wheels of various sizes without requiring the removal or changing of any of the parts of the machine.

Further objects of my invention are the provision of improved means for holding the wheel during the application of the tire, the provision of simple and effective mechanism for imparting the required degree of tension to the holding-wires, and the construction of the apparatus in such a way that the ends of the wires are readily accessible during the operation of uniting them.

To these and other ends my invention consists in certain novel features, which I will now proceed to describe and will then particularly point out in the claims.

In the accompanying drawings.

In carrying out my invention I employ a suitable supporting-frame 1, provided with longitudinal ways 2, in which is mounted to slide a carriage 3, having a vertical spindle 4, mounted in a threaded aperture in the carriage 3 and provided with a hand-wheel 5, by means of which it may be rotated to adjust it vertically. The spindle 4 is provided with a conical holder 6, which is adapted to enter the hub 7 of the wheel 8 to be operated upon. The longitudinal adjustment of the carrier and the vertical adjustment of the spindle serve to adapt the machine to the reception of wheels of varying diameter and thickness or length of hub.

At the forward portion of the frame 1 there is provided a transverse table 9, above which is located a bed-plate 10, supported by suitable columns or uprights 11 or in any other suitable manner. This bed-plate is provided on each side of its central portion with curved ways 12, the center of curvature of said ways lying upon a line drawn centrally between and parallel with the ways 2, and between said ways 12 is located a central solid portion or bridge 13 of the bed-plate, in which is removably mounted the wire-clamping post 14. The preferred construction of this portion of the apparatus is that shown, in which the bridge 13 is shown provided with a polygonal aperture 15, while the post 14 is provided with a similarly-shaped shank 16, which fits within said aperture and is readily removable therefrom. The upper portion of the clamping-post 14 is shown as provided with a shoulder 17, above which extends a reduced threaded portion 18, on which is loosely mounted a washer 19, preferably provided with teeth or serrations, as shown, and a second loose washer 20, above which there is mounted on the threaded portion 18 a nut 21. It will be seen that the spaces between the washer 19 and the shoulder 17 and between the washers 19 and 20 form clamping-jaws which are adapted to receive the wires by means of which the tire is held, said clamping-jaws being controlled by means of the nut 21.

Figure 1:
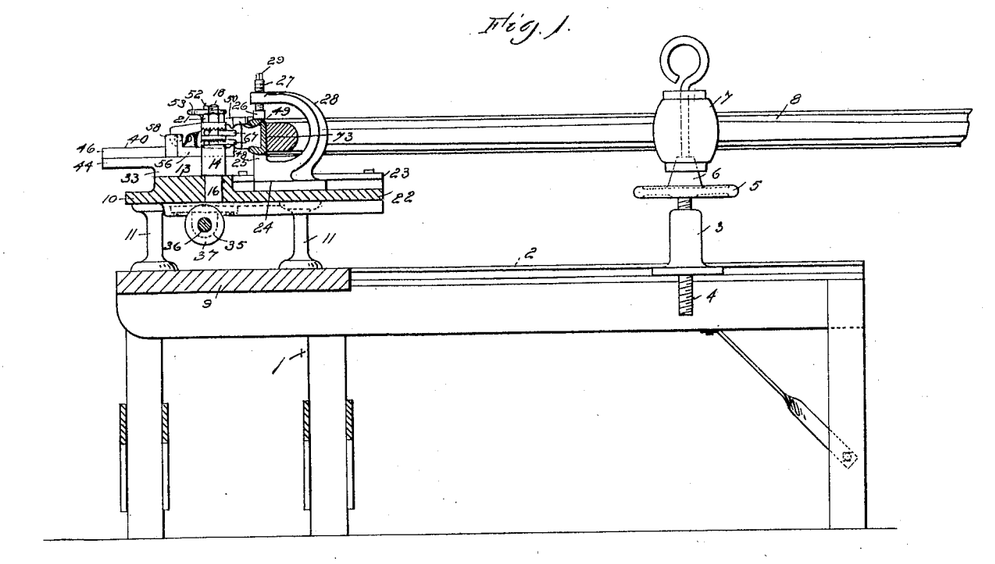
Figure 1 is a central vertical section, partly in elevation, of an apparatus embodying my invention in one form.
Figure 2:
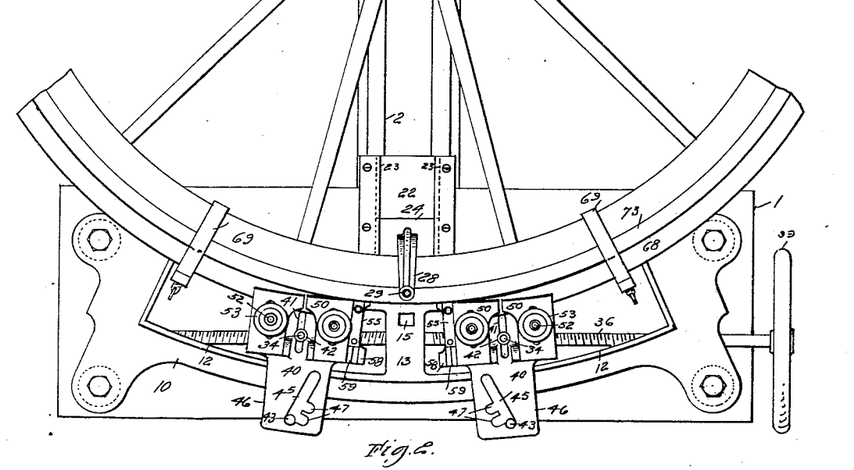
Fig. 2 is a plan view of the main portion of the apparatus.
Figure 17:
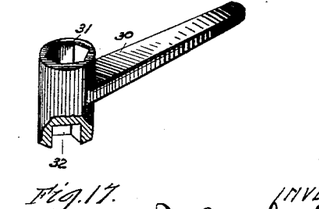
Fig. 17 is a detail view of the device by means of which the wheel-clamp and wire-clamping post are operated.

The wheel is held at its hub while being operated upon in the manner already described and is additionally supported at its periphery in the following manner: The bed-plate 10 is provided with a horizontal extension 22 in line with the central bridge-piece 13 and having ways 23, which are parallel with and above the ways 2, their general arrangement being radial with regard to the curved ways 12. The carriage 24 is mounted to slide in the ways 23 and is provided with clamping-jaws which are adapted to grip the wheel by means of the sides of its channeled metal rim, as indicated in Fig. 1. Preferably the lower or fixed jaw 25 is formed directly on the carriage 24, while the upper or movable jaw 26 is swiveled on the lower end of a screw 27, mounted in a curved or C-shaped arm 28 on the carriage 24. The upper end of the screw-shaft 27 is preferably provided with a wrench-grasp 29, by means of which said screw may be rotated to operate the movable clamping-jaw 26. As a convenient means for operating said screw and the clamping end of the wire-clamping post I may employ a wrench 30, such as is shown in Fig. 17 of the drawings, having at one end of its head a socket 31 to fit the nut 21 and at the other end a socket 32 to fit the wrench-grasp 29 on the clamping-screw 27.

In each of the curved ways 12 there is mounted a slide 33, fitted to said ways, and each slide has swiveled in it at about its center a vertical pin 34, provided at its lower end with a threaded head or nut 35. A right and left threaded feed-screw 36 passes through the nuts 35 and is provided at its central portion with a collar 37, which fits between ribs or ways 38 on the under side of the table 10 and prevents longitudinal movement of the screw. The feed-screw 36 is provided with a hand-wheel 39 or other suitable operating means, and it is obvious that the rotation of the feed-screw will cause the slides 33 to approach or recede from each other as desired, while at the same time traveling along the curved ways 12.

Each slide 33 has loosely mounted upon it a clamping-plate 40, which is adjustable relatively to said slide. The construction which I prefer for this purpose is that shown, in which each clamping-plate 40 is provided with a longitudinal slot 41, through which the pin 34 extends and above which said pin is provided with a collar or enlargement 42, which holds the clamping-plate in position on the slide. The parts are further connected by means of a pin 43, mounted on an extension 44 of the slide 33 and passing through a diagonal slot 45 in a similar extension 46 of the clamping-plate 40. This diagonal slot is provided with lateral notches 47, which are adapted to receive the pin 43 under certain circumstances hereinafter set forth.

Each clamping-plate 40 is preferably provided with two sets of tire-clamping jaws, which may be termed, respectively, the "inner" and "outer" pair of jaws, these terms being used with reference to their location relatively to the central line of the machine. The preferred construction of these jaws is that shown, in which the lower or fixed jaw 48 is formed upon the inner edge of the body proper of the clamping-plate 40, while the upper or movable jaw 49 is formed upon a plate 50, pivoted upon an axis 51 between lugs 52, arising from the body of the plate 40. Each plate 50 is slotted longitudinally, as indicated at 51, for the passage of a bolt 52, on which there is mounted above the plate 50 an adjusting-nut 53 and below the plate 50, between it and the plate 40, a coöperating spring 54. The two sets of jaws on each slide may thus be readily and independently operated to grip or release the rubber tire.

Figures 4, 5, 6, 7, 8, 9, 10, 11, 12, 16:
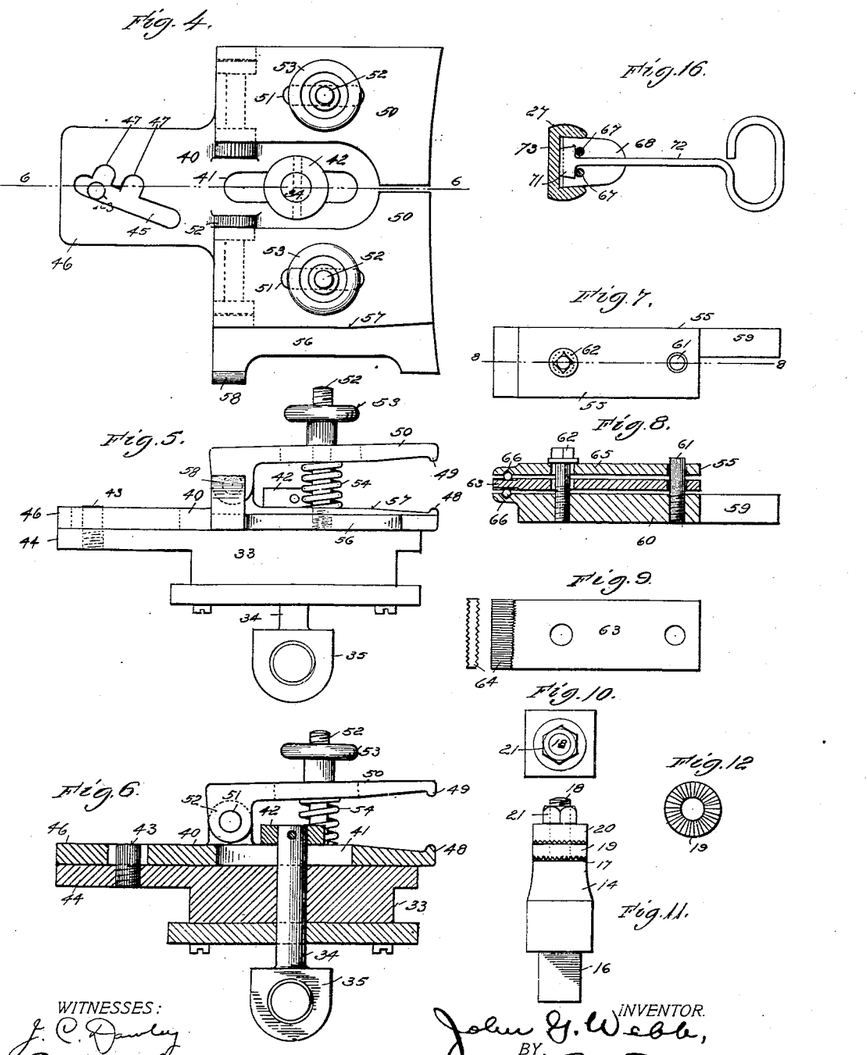
Fig. 4 is a detail plan view of one of the pairs of tire-clamping jaws detached.
Fig. 5 is a side elevation of the same.
Fig. 6 is a vertical sectional view taken on the line 6 6 of Fig. 4.
Fig. 7 is a plan view of one of the sets of wire-clamping jaws.
Fig. 8 is a sectional view of the same taken on the line 8 8 of Fig. 7.
Fig. 9 shows the intermediate plate of the wire-clamping jaws in end view and plan.
Fig. 10 is a plan view of the wire-clamping post.
Fig. 11 is an elevation of the same.
Fig. 12 is a plan view of the washer or intermediate clamping-jaw carried by the post.
Fig. 16 is a detail sectional view illustrating the means for holding the wires clear of the bottom of the channel during the removal of the compression from the rubber.

Each clamping-plate 40 is provided with a seat to receive a suitable wire-clamping device—such, for instance, as is shown in detail in Figs. 7, 8, and 9 of the drawings, and which I have indicated as a whole by the reference-numeral 55. This seat or receptacle comprises a horizontal extension or flange 56, on which the wire-clamp rests, a vertical shoulder or abutment 57, against which the wire-clamp bears laterally in one direction, and an upright lug or projection 58, against which the stem or shank 59 of the wire-clamp bears horizontally in the opposite direction. The wire-clamp in its preferred form comprises a body portion 60, having the stem or shank 59 and provided with an upwardly-extending pin 61 and clamping-bolt 62. Said pin and bolt pass loosely through suitable apertures in an intermediate clamping-plate 63, which is preferably serrated on both sides of its gripping end, as indicated at 64. Said pin and bolt also pass through suitable apertures in a clamping-plate 65, and grooves 66 are preferably formed in the clamping-jaws of the body 60 and plate 65, as indicated in Fig. 8, in order to more firmly hold the wires.

Figure 13:
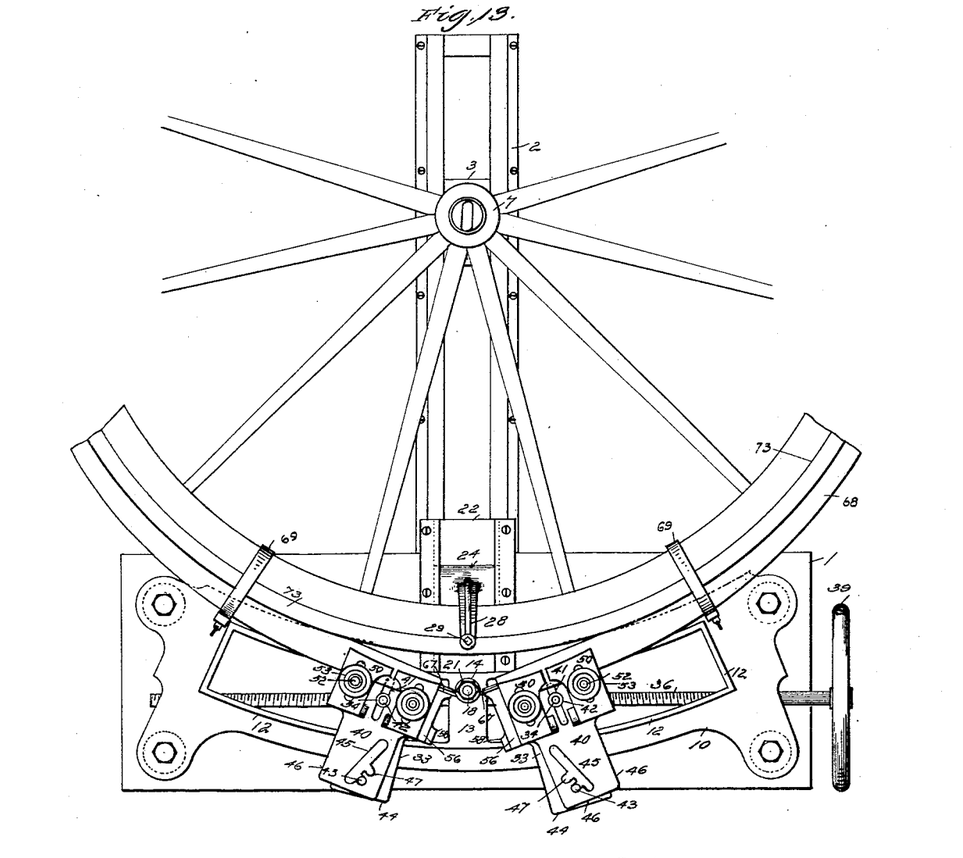
Fig. 13 is a view similar to Fig. 2, but on an enlarged scale, showing the initial position of the parts during the operation of the apparatus.
Figure 14:
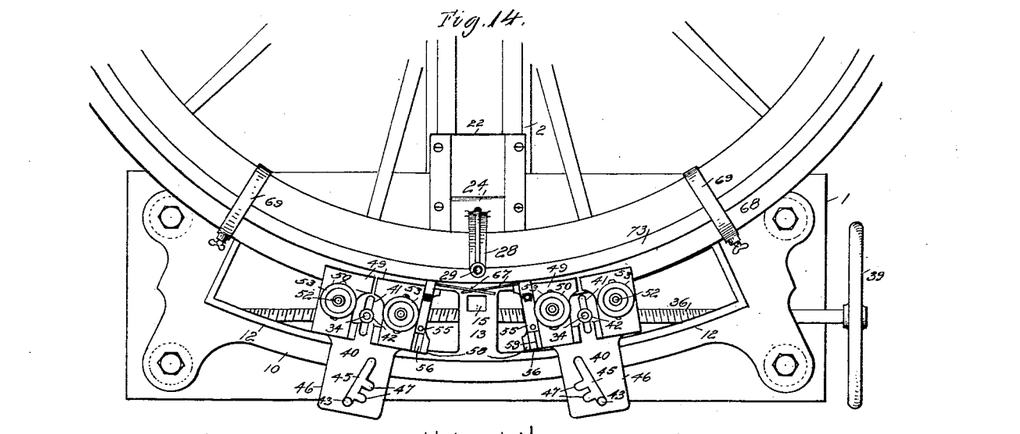
Fig. 14 is a view showing the position of the parts subsequently to that shown in Fig. 13 and prior to that shown in Fig. 2.
Figure 15:
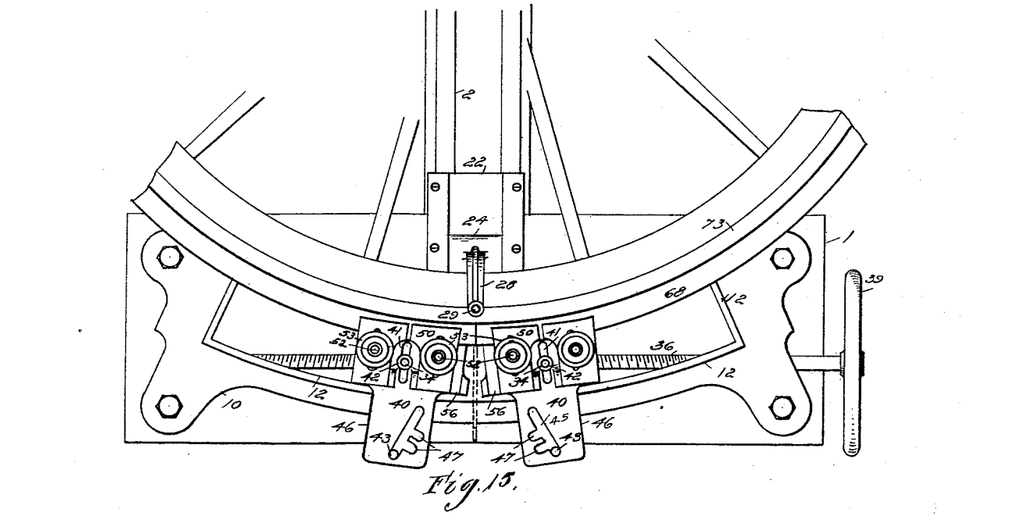
Fig. 15 is a similar view showing the position of the parts subsequently to that shown in Fig. 2.

Before describing the operation of my improved apparatus I wish it to be understood that the particular form of apparatus shown is one especially devised for use in the application of rubber tires provided with two retaining-wires. My invention is not, however, limited to such an apparatus, as it will be readily seen that it might be modified so as to be used for the application of tires employing a greater or less number of wires than two. Referring to the particular form of apparatus shown, however, its operation is as follows: The wires, which are indicated at 67, are first inserted into the rubber tire, which is indicated at 68, and this latter is then placed within the channeled rim 73 of the wheel 8 either before or after said wheel has been placed in position within the apparatus. The clamping-post 14 being in position on the bridge-piece 13, the ends of the wires are inserted in the spaces between the washer 19, shoulder 17, and washer 20 and are there clamped by means of the nut 21, as indicated in Fig. 13 of the drawings. The tire is then secured to the rim by means of suitable clamps 69 at points approximately opposite the ends of the ways 12, as also indicated in Fig. 13. These clamps 69 will limit the subsequent compression of the rubber upon the wire to those portions of the tire which lie between said clamps and the ends of the tire. The clamping-plates 40 are then moved forward until the inner pairs of clamping-jaws extend over the rubber of the tire at the ends thereof, whereupon said inner pairs of jaws are clamped upon the rubber, and the feed-screw 36 is so rotated as to force the slides and their clamping-jaws away from each other, thus compressing the rubber upon the wires between the clamping-jaws and the clamps 69 and leaving the necessary amount of wire exposed at the ends of the retaining-wires to permit of the proper joining of said ends. After the rubber has been sufficiently compressed the wire-clamps 55 are applied to the wires immediately adjacent to the inner edges of the inner clamping-jaws and the ends of the rubber tire, said wire-clamps resting in the seats provided for them on the clamping-plates 40. The wires may now be cut to the desired length, whereupon the wire-clamping post may be removed, thus leaving the front central portion of the apparatus open and unobstructed, so as to give free access to the ends of the wire for the purpose of joining them. The retaining-wires are cut to such a length that their ends do not meet until considerable tensional strain is placed upon the wires, and this tensional strain is applied by so rotating the feed-shaft at that time as to cause the slides to approach each other. It follows that since the wire-clamps are seated in the clamping-plates 40 and the inner clamping-jaws of said plates are gripped upon the rubber immediately back of the wire-clamping jaws the ends of the wires are drawn toward each other sufficiently to bring them into proper position for uniting them. In the present instance I have shown a construction in which the ends of the wire are united by brazing, such brazing being supplemented by means of a nipple or sleeve into which the ends of the wire extend and to which and to each other they are united by the brazing material. Such brazing may be readily effected by placing the brazing material within the nipple and slipping the nipple over the meeting ends of the wire as they approach each other, whereupon heat applied to the exterior of the nipple will melt the brazing material and cause it to unite the several parts.

Figure 3:
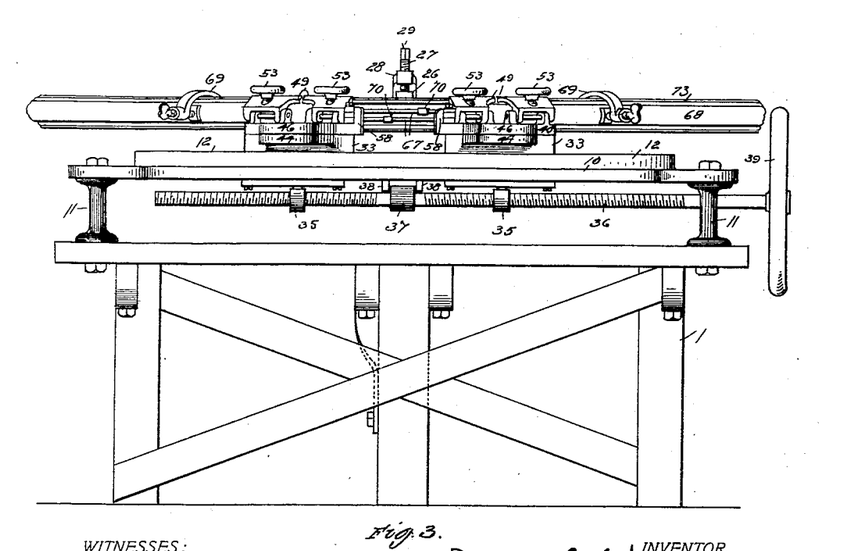
Fig. 3 is a front elevation.

In practice I prefer to so locate the joints of the two wires that they are not directly side by side, but are located at separated points of the periphery of the wheel. To this end the wires are so cut and manipulated that the ends of the wire at one side of the tire meet at one side of the central plane of the apparatus, while the ends of the wire at the other side of the tire meet at the other side of said central plane. This is clearly indicated in Fig. 3 of the drawings, where the two sleeves or nipples which are located at the junction of the ends of the wires are indicated at 70. After the ends of the wires have been united it becomes necessary to remove the compression from the rubber tire, and to this end the slides are moved outward to the proper extent and the outer pairs of clamping-jaws are clamped upon the rubber, whereupon the movement of the feed-screw is reversed and the clamping-jaws, moving toward each other, remove the compression and distribute it equally throughout the compressed portion of the tire, more especially as to the outer portions thereof, or those portions farthest from the ends of the tire. During this operation in order to hold the retaining-wires clear of the bottom of the channel, and thereby prevent binding of that portion of the rubber which lies between the wires and the bottom of the channel between said parts, I employ the device shown in detail in Fig. 16 of the drawings, which consists of a bridge-piece or support 71, provided with a handle 72 and adapted to be inserted between the wires after their ends are united and before the compression is removed from the rubber and then turned transversely of the channel, so as to support the wires in an elevated position, as indicated in Fig. 16.

After the greater portion of the compression has been removed from the rubber and before the ends of the tire meet the support 71 is so turned as to permit of its being slipped out between the wires, whereupon the outer pair of tire-clamping jaws are loosened, the inner pair are tightened upon the rubber, and the two slides are moved toward each other by means of the feed-screw until the ends of the tire meet. Just previous to the meeting of the ends they may be coated with a suitable cement to insure their firm union. It will be seen that after the ends of the tire have met the joints of the retaining-wires do not lie in the plane of meeting, but lie respectively on opposite sides thereof, so that no extra strain is brought upon the tire at the point where its ends meet, and such strains as exist in the neighborhood of this point are equalized.

After the tire has been applied the wheel may readily be removed by releasing the rim-clamping device and sliding the carrier 24 backward until the said clamping device is clear of the peripheral portion of the wheel, whereupon the latter may be readily removed from the carrier 3.

It will be understood that during the entire series of operations hereinbefore described the carriers 3 and 24, by means of which the wheel is supported, are free to move longitudinally in their ways, so that in case the curvature of the wheel does not conform to the curvature of the ways 12, which control the movement of the slides, the wheel will be free to move backward and forward in the apparatus, so as to accommodate itself to the movements of the slides and of the clamping-jaws carried by them. The apparatus is thus adapted to operate upon wheels of widely-varying sizes without any alterations or changing of the parts thereof, and this adaptation is further carried out by the adjustable mounting of the clamping-plates upon the slides, which permits of their being readily moved upon these latter, so as to operate upon tires of different sizes and different degrees of curvature. As soon as any strain is brought upon the tire-clamping jaws the pins 43 will readily find suitable bearings upon the walls of the slots 45 or within the notches or recesses 47, formed in said walls.

The special advantage obtained by holding the wheel against rotary motion while operated upon by clamping it at its periphery is that no strain is placed upon the spokes of the wheel, and the wheel is thus less liable to be broken. Heretofore it has been customary in apparatus of this character to prevent rotation of the wheel by causing an arm or stop to engage the wheel at the point of junction of one of its spokes with the felly, and it has consequently been frequently found that the lateral strain thus brought upon the spoke at its weakest point was sufficiently great to break the spoke, and thus destroy the utility of the wheel. Such breakage is obviously avoided when the wheel is clamped in the manner hereinbefore set forth.

The curvature of the ways 12 is preferably either the mean curvature of the extreme sizes of wheels to be operated upon or the curvature of the size most frequently used. The edges of the tire-clamps are correspondingly curved, and it will be observed that said edges form stops or shoulders, which will abut against the edges of the rim-flanges, and thus insure the gripping of the rubber in the most efficient manner.

It will be noted that the clamping devices whether used for compressing or releasing the rubber or for tensioning the retaining-wires operate in unison in such a manner that the torsional strain on the wheel is neutralized. For the same reason the strains on the rubber and on the wires are equalized and evenly distributed.

Although I have described a mode of manipulation of the apparatus in which the pairs of tire-clamping devices are used alternately, yet it is obvious that under certain circumstances—such, for instance, as when operating upon tires of large size—both pairs of clamps may be used simultaneously and that the clamps may be caused to grip the rubber with varying degrees of force, as the case may require. It will also be understood that the clamps 69 will be taken off after the compression of the rubber has been removed.

Various modifications in the structural features set forth may obviously be made without departing from the principle of my invention, and I therefore do not wish to be understood as limiting myself to the precise details hereinbefore described, and shown in the drawings.

Having thus fully described my invention, what I claim as new, and desire to secure by Letters Patent, is—

1. In an apparatus of the class described, the combination, with a suitable wheel-support, of means for gripping both ends of the retaining-wires, and means for simultaneously compressing the rubber in both directions away from the ends of the wires, substantially as described.

2. In an apparatus of the character described, the combination, with a suitable wheel-support, of rubber-clamping devices movable toward and from each other in ways adjacent to the periphery of the wheel, substantially as described.

3. In an apparatus of the character described, the combination, with a suitable wheel-support, of curved ways located adjacent to the periphery of the wheel, slides mounted on said ways and provided with rubber-clamping devices, and means for moving said slides toward and from each other, substantially as described.

4. In an apparatus of the character described, the combination, with a suitable wheel-support, of two slides located adjacent to the periphery of the wheel and movable toward and from each other, and means for actuating said slides positively in both directions, each slide being provided with wire-gripping devices, whereby the retaining-wires may be tensioned and held in position for brazing, and with rubber-clamping devices for clamping the rubber, whereby the rubber may be compressed to expose the ends of the wires when the slides are moved in one direction, and whereby such compression may be removed and the ends of the rubber brought together when the slides are moved in the opposite direction, substantially as described.

5. In an apparatus of the character described, the combination, with a suitable wheel-support, of ways located adjacent to the periphery of the wheel, slides mounted on said ways, means for moving said slides toward and from each other, rubber-clamping devices carried by said slides, and wire-gripping devices mounted on said slides adjacent to the rubber-gripping devices, substantially as described.

6. In an apparatus of the character described, the combination, with a suitable wheel-support, of a table provided with curved ways adjacent to the periphery of the wheel, a stationary post located between said ways and provided with means for gripping the ends of the retaining-wires, slides mounted on said ways and provided with rubber-clamping devices, and means for simultaneously moving said slides away from each other and from the post, substantially as described.

7. In an apparatus of the character described, the combination, with a suitable wheel-support, of a table provided with curved ways located adjacent to the periphery of the wheel, a stationary post removably mounted between said ways and provided with means for gripping the ends of the retaining-wires, slides mounted on said ways and provided with rubber-clamping devices, and means for simultaneously moving said slides away from each other and the post, substantially as described.

8. In an apparatus of the character described, the combination, with a suitable wheel-support, of a table provided with curved ways adjacent to the periphery of the wheel, slides mounted on said ways and provided with rubber-clamping devices, swiveled nuts carried by said slides, a right and left threaded feed-screw passing through said nuts, and means for preventing longitudinal movement of the feed-screw, substantially as described.

9. In an apparatus of the character described, the combination, with curved ways, slides mounted on said ways and provided with clamping devices, and means for moving said slides toward and from each other, of a wheel-support mounted and movable on ways located and arranged radially relatively to the curved slideways, substantially as described.

10. In an apparatus of the character described, the combination, with curved ways, and slides mounted on said ways and provided with clamping devices and with means for moving said slides toward and from each other, of ways arranged radially relatively to said slideways, and wheel-supporting devices freely movable on said radial ways, substantially as described.

11. In an apparatus of the character described, the combination, with curved ways, and clamping devices movable thereon, of independent supporting devices for the hub and periphery of the wheel, the former being vertically adjustable, and ways arranged radially to the curved slideways, on which said wheel-supporting devices are movably mounted, substantially as described.

12. In an apparatus of the character described, the combination, with a suitable wheel-support, of slides movable toward and from each other on ways adjacent to the periphery of the wheel, and clamping-plates mounted on said slides and adjustable thereon radially with respect to the wheel to be operated on, substantially as described.

13. In an apparatus of the character described, the combination, with a suitable wheel-support, of slides mounted on ways adjacent to the periphery of the wheel, each slide being provided with a plurality of pairs or sets of clamping-plates, substantially as described.

14. In an apparatus of the character described, the combination, with a suitable wheel-support, of slides located on ways adjacent to the periphery of the wheel, rubber-clamping plates mounted on said slides and provided with seats, and wire-gripping devices removably mounted in said seats, substantially as described.

15. In an apparatus of the character described, the combination, with a suitable wheel-support, of slides mounted on ways adjacent to the periphery of the wheel, and rubber-clamping plates mounted on said slides and provided with curved edges adapted to abut against the edges of the flanges of the channel of the wheel, substantially as described.

16. In an apparatus of the character described, the combination, with means for removing the compression from the rubber after the ends of the wires are joined, of a wire-supporting device adapted to be inserted in the channel of the rim, between the retaining-wires and the bottom of the channel, and so shaped as to be readily removable from the channel, substantially as described.

17. In an apparatus of the character described, the combination, with a suitable wheel-support, and rubber-clamping devices movable toward and from each other, of a wire-supporting device adapted to be inserted in the channel of the wheel between the retaining-wires and the bottom of the channel and removable therefrom, substantially as described.

18. In an apparatus of the character described, the combination, with a suitable wheel-support, and clamping devices movable toward and from each other, of a wire-support comprising a bridge-piece or strut provided with a handle and adapted to be inserted between the wires and the channel and removable therefrom, substantially as described.

In testimony whereof I affix my signature in presence of two witnesses.

JOHN G. WEBB.

Witnesses:
IRVINE MILLER,
WILLIAM O'LAUGHLIN.